Patented Feb. 14, 1939

2,146,858

UNITED STATES PATENT OFFICE 2,146,858

METHOD OF APPLYING VITREOUS ENAMELS

Walter J. Scott, Hinsdale, Ill., assignor to Western Electric Company, New York, N. Y., a corporation of New York No Drawing. Application April 1, 1936, Serial No. 72,221

6 Claims. (Cl. 91—72)

This invention relates to a method of applying a vitreous enamel, and more particularly to a method of applying a matte or dull finish vitreous enamel.

Matte or dull finish vitreous enamels are known which are applied in the wet state as by spraying or dipping the part to be enameled in a ceramic slip. However, the quality of such enamels are not as high as enamels made of dry frits.

An object of the present invention is to provide an effective and efficient method of applying a matte finish vitreous enamel to a surface.

In accordance with one embodiment of the invention, a mixture of two dry enamel frits having different maturing temperatures is fired at the maturing temperature of the frit having the lower maturing temperature to produce a matte or dull finish enamel.

Other objects and advantages will appear from the following description.

For many purposes a glossy enamel finish is not satisfactory on account of the objectionable glare produced when viewed in the light from certain angles. Dull or matte finish enamels of the type that are applied wet as by a spraying or dipping process are used to some extent. However, such enamels have the disadvantage of that they require a flotation or suspending agent such as clay or the like, which does not become part of the glass during the firing process, but remains in the enamel in a finely divided form. Moreover, these enamels in order to be matte rather than glossy, contain a suitable percentage of other materials such as aluminum oxide or zinc oxide. Enamels of this type are less resistant to acids and to atmospheric attack and do not wear as well.

The present invention contemplates the use of dry frits which are usually applied to the surface to be enameled by sifting the frits thereon. The dry enamel frits do not require a flotation agent and consist entirely of vitreous material. When two enamel frits are selected, one of which has a higher maturing temperature than the other, and the material is fired at the maturing temperature of the frit having the lower melting temperature, a dull or matte finish enamel surface is obtained. The second frit is preferably selected to have a maturing temperature from 50° F. to 100° F. higher than the first frit, although materials of a much wider range of temperatures may be used. If desired, the firing temperature may be slightly above the maturing temperature of the frit having the lower maturing temperature, so that the frit having the higher maturing temperature will be softened to a sufficient extent to form a more completely integral mass with the completely fused frit. As an illustrative example, a suitable enamel frit having a maturing temperature of approximately 1500° F. may be made by compounding the following ingredients:

| | Per cent |
|---|---|
| Red lead | 40 |
| Pearl ash (potassium carbonate) | 6 |
| Sodium nitrate | 9 |
| Arsenic oxide | 6 |
| Flint | 31 |
| Borax | 8 |

These ingredients are smelted together at a high temperature and thereafter the molten mass is poured on a steel plate in order to cool it slowly to develop its opacity, after which it is ground into particles of suitable size. Other types of enamels are cooled by pouring into water.

A second frit having a maturing temperature of approximately 1550° F. may be compounded as follows:

| | Per cent |
|---|---|
| Red lead | 37.4 |
| Pearl ash | 5.6 |
| Sodium nitrate | 8.4 |
| Arsenic oxide | 5 |
| Flint | 38 |
| Borax | 5.6 |

These ingredients are smelted together and vitrified in the same manner described in connection with the frit having the slightly lower temperature. The two frits made in this manner may be mixed together and sifted onto a surface to be enameled or they may be applied separately. By selecting two enamel frits which have maturing temperatures which are sufficiently far apart that one of the frits may be completely fused while the other frit is only partially fused, there is produced a matte finish which does not have an objectionable glare and yet has a high degree of mechanical strength due to the excellent bonding between the completely fused frit and the partially fused frit. A matte finish produced in this manner has no noticeable roughness to the naked eye and will not collect dirt.

While the ingredients of only two enamel frits have been given, the invention has been used with frits made of other ingredients, the compositions of the vitreous enamel frits form no part of the present invention, and it will be understood that many changes and modifications may be made without departing from the spirit and scope of this invention.

What is claimed is:

1. A method of applying a matte finish vitreous enamel which comprises fusing flint and flux in predetermined proportions to form an enamel frit having a relatively high maturing temperature, forming a second enamel frit having a relatively low maturing temperature by fusing flint and flux in different proportions, applying both frits to a surface to be coated, and firing the coated surface at a temperature below the maturing temperature of the frit having the highest maturing temperature but high enough to fuse the frit having the lower maturing temperature.

2. The method of applying a matte finish vitreous enamel which comprises compounding two similar enamel frits having substantially the same ingredients but in different proportions and having different maturing temperatures, mixing the two compounded frits, applying the mixture to a surface to be coated, and firing the coated surface to fuse the frit having the lower maturing temperature and partially fuse the frit having the higher maturing temperature.

3. A method of applying a matte finish vitreous enamel which comprises the steps of compounding an enamel frit containing 31% flint and the balance substantially flux, compounding a second enamel frit containing 38% flint and the balance substantially flux, mixing the two compounded frits, applying the mixture to a surface to be coated, and firing the coating to completely fuse the frit containing 31% flint and partially fuse the frit containing 38% flint.

4. A method of applying a matte finish vitreous enamel which comprises forming one enamel frit by fusing a mixture of substantially 40% red lead, 6% potassium carbonate, 9% sodium nitrate, 6% arsenic oxide, 31% flint and 8% borax, pulverizing the fused mass, forming a second enamel frit by fusing a mixture of substantially 37% red lead, 6% potassium carbonate, 8% sodium nitrate, 5% arsenic oxide, 38% flint and 6% borax, pulverizing the fused mass, applying the two frits to a surface to be coated, and firing the coated surface at a temperature to completely fuse the first frit and partially fuse the second frit.

5. A method of applying a matte finish vitreous enamel comprising the steps of fusing vitrifiable materials and fluxes in certain proportions to form a frit having a predetermined maturing temperature, fusing vitrifiable materials and fluxes in different proportions to form a second frit having a relatively lower maturing temperature, mixing the two frits, applying the mixture to a surface to be coated, and firing the coated surface at a temperature at least as high as the maturing temperature of the frit having the lowest maturing temperature but lower than the maturing temperature of the frit having the highest maturing temperature.

6. A method of applying a matte finish vitreous enamel comprising the steps of fusing flint with suitable fluxes and pulverizing the fused mass to form a frit having a maturing temperature of the order of 1500° F., fusing flint with flux in different proportions and pulverizing the fused mass to form a second frit having a maturing temperature of the order of 5% higher, mixing the two frits, and firing said mixture at a temperature between the maturing temperatures of said first and second frits.

WALTER J. SCOTT.